United States Patent
Dinev et al.

[11] Patent Number: 5,837,998
[45] Date of Patent: Nov. 17, 1998

[54] TWO-DIMENSIONAL FIBER OPTIC ACCELERATION AND VIBRATION SENSOR

[76] Inventors: Petko D. Dinev; Tamara S. Dinev, both of 460 NW. 20-th St., apt. #D112, Boca Raton, Fla. 33431

[21] Appl. No.: 668,730

[22] Filed: Jun. 24, 1996

[51] Int. Cl.[6] .................................................. H01J 5/16
[52] U.S. Cl. .................... 250/227.11; 250/559.3; 359/28; 73/511
[58] Field of Search ........................... 250/227.11, 231.1, 250/227.21, 559.3; 356/373, 28; 73/504.15, 504.14, 504.03, 511, 514.01, 514.02

[56] References Cited

U.S. PATENT DOCUMENTS

| | | | |
|---|---|---|---|
| 4,239,963 | 12/1980 | August et al. | 250/231 R |
| 4,353,259 | 10/1982 | Schneider, Jr. | 73/653 |
| 4,376,390 | 3/1983 | Rines et al. | 73/517 A |
| 4,403,144 | 9/1983 | Strahan et al. | 250/231 R |
| 4,567,771 | 2/1986 | Nelson et al. | 73/653 |
| 4,595,830 | 6/1986 | McMahon | 250/227.21 |
| 4,792,676 | 12/1988 | Hojo et al. | 250/231 GY |
| 5,063,781 | 11/1991 | Conforti et al. | 73/651 |
| 5,142,485 | 8/1992 | Rosenberg et al. | 364/566 |
| 5,276,322 | 1/1994 | Carome | 250/227.21 |
| 5,339,690 | 8/1994 | Bar-Avi | 73/505 |

OTHER PUBLICATIONS

Petko Dinev, May 1995, "A two–dimensional fiber–optical vibration sensor" publ. Measurement Sci. and Technology, pp. 1395–1398.

Petko Dinev, Jan. 1996, "Two–dimensional fiber–optic accelerometer" publ. Rev. Sci. Instrum. v 67, #1, Sep. 1995, pp. 288–290.

*Primary Examiner*—Que Le

[57] ABSTRACT

A simple, novel and reliable two-dimensional, cantilever based fiber optic acceleration and vibration sensor, able to measure constant and/or variable acceleration, velocity, displacement, and frequency spectrum simultaneously in two perpendicular directions is presented. The sensor has a long live-span, high sensitivity, wide dynamic range and linear response in both directions. According to one aspect of the present invention, the two-dimensional fiber optic accelerometer includes an elongated light conducting elastic member with a round cross-section which first end is coupled to a light emitting source. The elastic member can be an optical fiber, and is mounted on a support structure in such a way that its second end forms a cantilever. A lens focuses the light irradiated from the elastic member onto a dual axis position photosensor. Thus, the lens, the elastic member and the photosensor form an optical lever. Under acceleration the elastic member flexes and the focused light spot moves over the photosensor sensitive area in accordance with the applied acceleration. The optical lever magnifies the light spot displacement. A signal processing unit supplied with output signals from the photosensor computes the deflection amplitude and direction of the second end of the elastic member relative to the support structure. Then the unit generates signals proportional to the components of the acceleration, velocity, displacement, and frequency spectrum of the moving object in two perpendicular directions. By using a combination of two or more sensors, an angular acceleration and velocity can be measured as well.

8 Claims, 2 Drawing Sheets

TWO-DIMENSIONAL FIBER OPTIC ACCELERATION AND VIBRATION SENSOR

BACKGROUND—FIELD OF INVENTION

This invention relates to a two-dimensional fiber optic acceleration and vibration sensor for measuring two perpendicular components of an acceleration, velocity, displacement and frequency spectrum of a moving object to which the sensor is attached, utilizing an optical lever and a dual-axis position photosensor.

BACKGROUND—DESCRIPTION OF PRIOR ART

Due to their small size and high sensitivity fiber optic accelerometers are widely used as a motion sensing instruments in civil airplanes, missiles, combat aircraft and the like.

Several types of spatially distributed one and two-dimensional fiber-optical acceleration and vibration sensors based on an elastic cantilever beam deflection have been proposed in the art. Unfortunately all of them suffer from some disadvantages.

The accelerometers, such as these described in the U.S. Pat. No. 5,276,322 to Carone (1994), U.S. Pat. No. 4,353,259 to Schneider, Jr. (1982) and U.S. Pat. No. 4,239,963 to August, et al. (1980), besides many other drawbacks, have one basic disadvantage:

(a) They are only one-dimensional, which limits their application and do not give a correct representation about the spatial motion of the tested object. If separate sensors are used for each direction, the obtained motion information is not always spatially and time correlated.

The two dimensional accelerometers, such as described in the U.S. Pat. No. 5,339,690 to Bar-Avi (1994), U.S. Pat. No. 5,142,485 to Rosenberg, et al. (1992) and U.S. Pat. No. 4,792,676 to Hojo, et al. (1988), are all gyroscopes in their nature, based on the Coriolis effect. The biggest disadvantages of this technique are:

(b) The necessity of continuous high speed rotation or vibration of the sensitive member, which involves additional components, increases the size and weight, and imposes a short live-span on the sensor.

(c) In reality, the gyroscopic angular momentum is not exactly conserved on account of frictional and other losses, which introduce an additional error in the measurements.

(d) The mentioned in (b) rotation or vibration is generated by means of internal magnetic or electric field, and if an external electromagnetic field is present during the sensor operation, both fields (internal and external) will interfere resulting in a significant error in the measurements.

(e) In all described accelerometers the output signal is not linearly proportional to the acceleration being measured, which requires additional electronics and look up tables for information processing.

(f) The direct illumination of the photosensor as described in U.S. Pat. No. 4,792,676 reduces the sensor resolution and dynamic range because of the natural light beam divergence due to the numerical aperture of the light conducting member.

(g) All described two-dimensional accelerometers have complicated designs which increases the manufacturing costs.

OBJECTS AND ADVANTAGES OF THE INVENTION

Accordingly, it is a general object of this invention to provide a new two-dimensional, cantilever based fiber optic acceleration sensor. Besides, several other objects and advantages are:

(a) to provide a novel and reliable two-dimensional fiber optic acceleration sensor, able to measure constant and/or variable acceleration, velocity, displacement, and frequency spectrum simultaneously in two perpendicular directions;

(b) to provide a two-dimensional, non gyroscopic in its nature acceleration sensor with a long live-span, which does not have a continuously rotating or vibrating sensing member;

(c) to provide a two-dimensional sensor which does not involve relative motion of any parts which are in physical contact; this eliminates errors due to frictional and other losses;

(d) to provide a stable operation and reliable data in an environment of external electromagnetic fields;

(e) to provide linear response in both directions;

(f) to provide measurements with high sensitivity and wide dynamic range;

(g) to provide a simple and inexpensive for manufacturing design.

These and other objects, advantages and features of the present invention will become more clear from the following detailed description of the preferred embodiments along with the accompanying drawings.

SUMMARY OF THE INVENTION

Accordingly, the present invention provides a simple, novel and reliable two-dimensional, cantilever based fiber optic acceleration and vibration sensor, able to measure constant and/or variable acceleration, velocity, displacement, and frequency spectrum simultaneously in two perpendicular directions. This sensor is non gyroscopic in its nature and has a long live-span, stable and reliable even in the environment of external electromagnetic fields. The utilized optical lever provides measurements with high sensitivity, wide dynamic range and linear response in both directions. According to one aspect of the present invention, the two-dimensional fiber optic accelerometer includes a light conducting elastic member with a round cross-section which first end is illuminated by a light emitting source. The elastic member can be an optical fiber, and is mounted on a support structure in such a way that its second end forms a cantilever. The second end of the elastic member is optically aligned with a lens which is also fixedly mounted on the sensor's support structure. The lens focuses the light irradiated from the second end of the elastic member on a dual axis position photosensor, fixedly mounted on the same support structure. Thus, along with the lens and the elastic member, the photosensor forms an optical lever. An additional weight may be attached to the second end of the elastic member for a sensitivity adjustment. Under acceleration the elastic member flexes and the focused light spot moves over the photosensor sensitive area in accordance with the applied acceleration. Due to the optical lever the light spot displacement over the sensing area of the photosensor is significantly bigger than the displacement which the flexed elastic member would cause over the sensing area of the photosensor without the lens. A signal processing unit supplied with output signals from the photosensor computes the deflection amplitude and direction of the second end of the elastic member relative to the support structure. Then the unit generates signals proportional to the components of the acceleration, velocity, displacement, and frequency spectrum of the moving object in two perpendicular directions. By using a combination of two or more sensors, an angular acceleration and velocity can be measured as well.

BRIEF DESCRIPTION OF DRAWINGS

The invention may take form in various parts and arrangements of parts or in various steps and arrangements. The drawings are only for purposes of illustrating a preferred embodiment and are not to be construed as limiting the invention.

REFERENCE NUMERAL IN DRAWINGS

9—support structure;
10—optical lever;
11—light conducting elastic member vertical support with a central opening;
12—light conducting elastic member;
13—second surface of the light conducting member;
14—optical lens;
15—lens support;
16—light sensitive cells (dual axis position photosensor);
16a—photosensor output terminal;
17—first surface of the light conducting member;
18—light emitting source;
19—light emitting source power supply;
20—signal processing unit;
21—processing module;
22—processing module deriving the acceleration components;
23—dual integrator module for determination of velocity components;
24—dual integrator module for determination of displacement amplitude;
25—Fourier transform module for determination of the frequency spectrum;
31—elongated member vertical support with a central opening;
32—elongated member;
33—photosensor supporting plate;
35—sensor body;
36—light emitting source vertical support with a central opening;
37—photosensor supporting plate;
38—springs;

DETAILED DESCRIPTION OF THE PREFERRED EMBODIMENT

Figure 1:
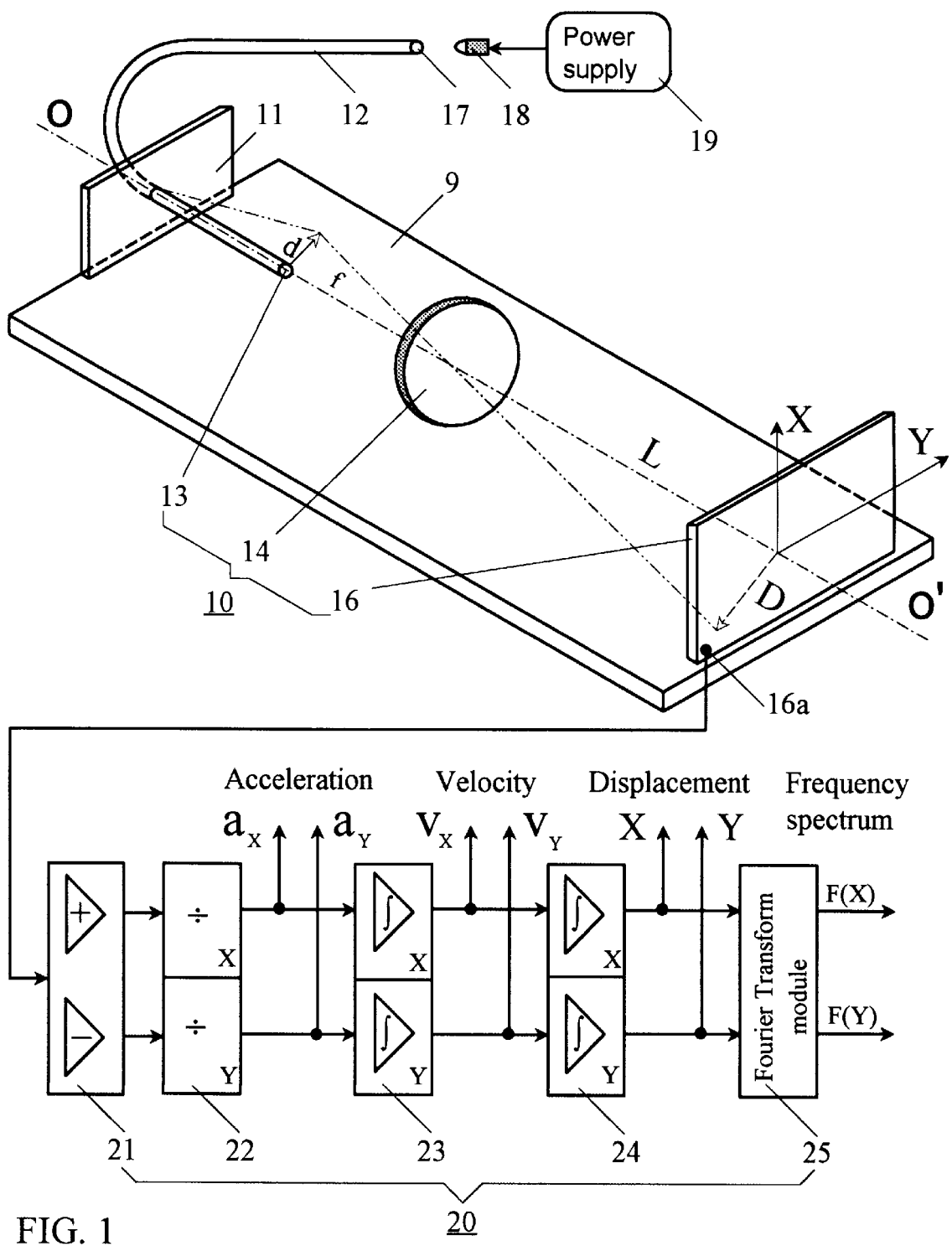
FIG. 1 shows a prospective view of one form of the two-dimensional fiber optic accelerometer along with a signal processing unit utilized for calculating the components of the acceleration, velocity, displacement, and frequency spectrum of the moving object in two perpendicular axes.

FIG. 1 shows a prospective view of one form of the two-dimensional fiber optic accelerometer along with a signal processing unit utilized for calculating the components of the acceleration, velocity, displacement, and frequency spectrum of the moving object in two perpendicular axes. With reference to FIG. 1 a light emitting source 18, connected to a power supply 19, is optically aligned with a surface 17 of one end of a light conducting elastic member 12 (hereinafter referred to as a elastic member) with a round cross-section made of a transparent material. Elastic member 12 can be an optical fiber. A vertical support 11 with a central opening substantially the same as the elastic member diameter is fixedly attached to one end of a sensor's support structure 9. Vertical support 11 can be a part of support structure 9. A portion of the other end of elastic member 12 is fixedly inserted into the central opening of a vertical support 11 and forms a cantilever. A surface 13 of elastic member 12 is optically aligned with the optical axis OO' of a lens 14. Lens 14 is fixedly mounted on support structure 9. A group of light sensitive cells (hereinafter referred to as a photosensor) 16, optically aligned with lens 14, is fixedly mounted on the other end of support structure 9. Thus, along with lens 14 and surface 13 of elastic member 12, photosensor 16 forms an optical lever 10. An output terminal 16a of photosensor 16 is connected to signal processing unit 20 which first processing module 21 comprises conventional sum and difference amplifiers. A processing module 22, comprising two conventional dividers (not shown), connects to module 21. A dual integrator module 23 connects to module 22 and to another dual integrator module 24. A Fourier transform module 25 is connected to module 24.

Light emitting source 18, supplied with a constant voltage or current by power supply 19, irradiates light into elastic member 12 towards lens 14 which focuses this light onto photosensor 16. Under acceleration, the cantilevered end of elastic member 12 flexes which causes a displacement d of irradiating surface 13 and the focused light spot shifts over the photosensitive area of photosensor 16. Due to optical lever 10 the light spot displacement D over the sensing area of photosensor 16 is significantly bigger than the displacement which the flexed elastic member 12 would cause over the sensing area of photosensor 16 without lens 14. If the distance between lens 14 and photosensor 16 is denoted as L, and the distance between lens 14 and surface 13 is denoted as f, the displacement D is defined by:

$$D=(L/f).d \tag{1}$$

It is clear from eq. (1) that optical lever 10 has a linear response and the displacement D is maximum if distance f is equal to the focal length of lens 14 i.e. surface 13 is located in lens 14 focal point.

Processing module 21, supplied with output signals from photosensor 16, computes the deflection amplitude and direction of elastic member 12 relative to support structure 9 and generates sum and difference signals for each direction X and Y. Module 22 processes these signals and for each direction computes the ratio of the difference signal to the sum signal. Then module 22 generates signals proportional to the measured accelerations $a_X$ and $a_Y$. These two signals are integrated separately in module 23 and a new pair of signals proportional to the velocity $V_X$ and $V_Y$ of the moving object are generated. These two signals are further integrated in module 24 and a new pair of signals proportional to the object displacement X and Y are generated. Module 25 performs Fourier transform on these signals and another pair of signals F(X), F(Y) proportional to the frequency spectrum of the motion is generated.

Figure 2:
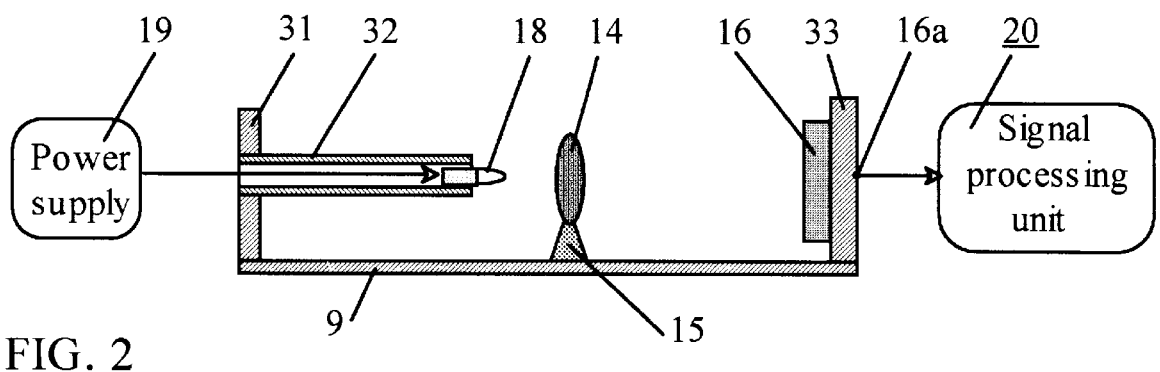
FIG. 2 shows an alternative embodiment of the two-dimensional sensor of FIG. 1.

FIG. 2 shows an alternative embodiment which is modified from and basically similar in structure to the embodiment shown in FIG. 1. In FIG. 2, like parts which correspond to those in FIG. 1 are marked with same reference numerals.

In this modified design elastic member 12 is replaced by an elongated member 32 with a round cross-section made of an elastic material. The first end of elongated member 32 is fixedly inserted into the central opening of a vertical support 31 in such a way that the second end of elongated member 32 forms a cantilever. Support 31, with a central opening substantially the same as the elongated member diameter, is fixedly attached to one end of a sensor's support structure 9. Light emitting source 18, connected to power supply 19 is inserted or attached to the second end of elongated member 32 and is optically aligned with lens 14 which is also fixedly mounted by lens support 15 on support structure 9. Photosensor 16, optically aligned with lens 14 is fixedly mounted on a supporting plate 33 which is also fixedly mounted on the other end of support structure 9. Thus, along with lens 14 and light source 18, photosensor 16 forms an optical lever similar to lever 10 from FIG. 1. Output terminal 16a of photosensor 16 is connected to signal processing unit 20.

The embodiment according to FIG. 2 works in the same way as described in FIG.1. Under acceleration, the cantilevered end of elongated member 32 flexes which causes a displacement of light source 18 and the focused light spot shifts over the photosensitive area of photosensor 16. Unit 20, supplied with output signals from photosensor 16, computes the deflection amplitude and direction of light source 18 relative to support structure 9, and generates signals proportional to the components of the acceleration, velocity, displacement, and frequency spectrum of the moving object in two perpendicular directions.

Figure 3:
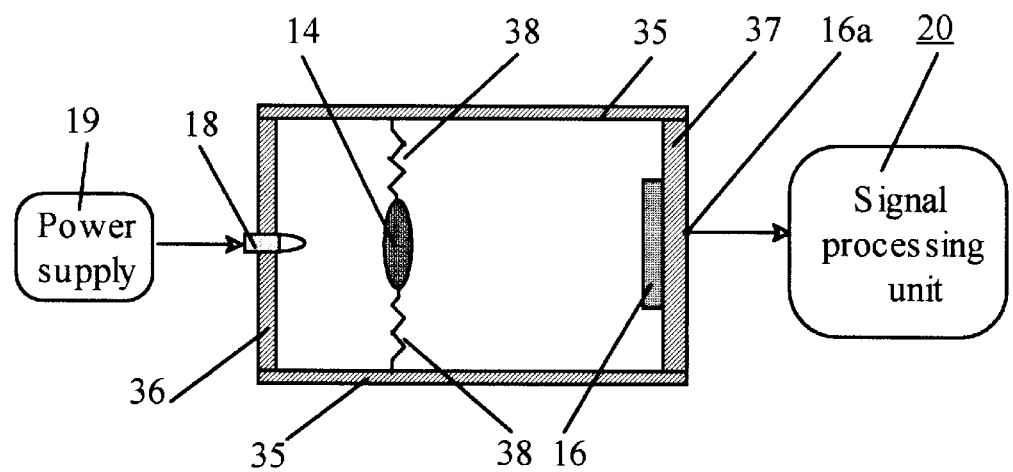
FIG. 3 shows another alternative embodiment of the sensor system of FIG. 1.

FIG. 3 shows another alternative embodiment which is modified from and basically similar in structure to the embodiment shown in FIG. 1. In FIG. 3, like parts which correspond to those in FIG. 1 are marked with same reference numerals. In these modified design elastic member 12 is replaced by light source 18. Light source 18, connected to power supply 19 is fixedly inserted into the central opening of a vertical support 36 and optically aligned with lens 14. Support 36 with a central opening substantially the same as the light source diameter is fixedly attached to one end of a sensor's body 35. Lens 14 is suspended by pair of springs 38, selected such that they have tendency to locate lens 14 in a plane perpendicular to the light beam irradiated from light source 18, to restrict lens motion only in this plane and to provide optical alignment with light source 18. The free ends of springs 38 are fixedly mounted on sensor's body 35. Photosensor 16, optically aligned with lens 14 is fixedly mounted on a supporting plate 37 which is also fixedly mounted on the other end of sensor's body 35. Thus, lens 14, light source 18, and photosensor 16 form an optical lever similar to lever 10 from FIG. 1. Output terminal 16a of photosensor 16 is connected to signal processing unit 20.

The embodiment according to FIG. 3 works in the same way as described in FIG.1. Under acceleration, lens 14 moves and the focused light spot moves over the photosensitive area of photosensor 16. Unit 20, supplied with output signals from photosensor 16, computes the deflection amplitude and direction of lens 14, relative to sensor's body 35, and generates signals proportional to the components of the acceleration, velocity, displacement, and frequency spectrum of the moving object in two perpendicular directions.

Conclusion, Ramifications and Scope of Invention

Accordingly, the reader will see that the present invention provides a simple, novel and reliable two-dimensional, cantilever based fiber optic acceleration and vibration sensor, able to measure constant and/or variable acceleration, velocity, displacement, and frequency spectrum simultaneously in two perpendicular directions. This sensor is non gyroscopic in its nature and has a long live-span, because it does not have a continuously rotating or vibrating sensing member. Furthermore, the simple and inexpensive for manufacturing design does not involve relative motion of any parts which are in physical contact; nor internal magnetic or electric fields are present which makes the proposed sensor stable and reliable even in the environment of external electromagnetic fields. The utilized optical lever provides measurements with high sensitivity, wide dynamic range and linear response in both directions. By using a combination of two or more sensors an angular acceleration and velocity can be measured as well.

The principles of the invention have been described with reference to the preferred embodiment. Obviously, many modifications and variations could occur to someone skilled in the art upon reading and understanding the preceding detailed description. Some of these possible modifications are listed below:

a) the elastic member is defined with a round cross-section in order to have an equal sensitivity in both directions; if different sensitivities are necessary for different directions, the cross-section may be of any predetermined shape in order to accomplish the sensitivity required;

b) the elastic member can be inserted into a elastic tube or to have a jacket made of elastic material for sensitivity adjustment;

c) an additional weight can be attached to the cantilever's free end for sensitivity adjustment; an enlarged portion of the elastic member also can be used for sensitivity adjustment;

d) the array of light sensitive cells can be a dual axis position photosensor, Charge Couple Device matrix or group of separate photodiodes connected in an appropriate way;

e) a fiber-optical bundle can be added to improve the sensor operation in an environment of high external electromagnetic fields, in such a way that the lens focuses the light beam onto the optical bundle, which carries the optical signal to the position photosensor; a group of individual fibers optically coupled to separate photodiodes can be also considered as a fiber-optical bundle;

f) a transparent viscous fluid could encase the elastic member and the lens for damping the vibration;

g) using a combination of several sensors, a multidimensional motion unit could be developed, serving for the simultaneous measurement of three linear and three angular rate components of the acceleration, velocity, and vibration amplitude and spectrum of the moving object;

h) any combination of optical lenses capable of focusing the light beam and magnifying the displacement of the second end of the elastic member can be used;

i) if a laser beam or other highly collimated light source is used, and/or if a magnification of the displacement is not necessary, the optical lens can be omitted;

j) a one-dimensional version of the described sensor can be developed if the elastic member is restricted to move only in a plane; in this case the photosensor can be a linear array of light sensitive elements;

It is intended that the invention be construed as including all such modifications and alterations insofar as they come within the scope of the appended claims or equivalents thereof.

We claim:

1. A two-dimensional optical acceleration and vibration sensor comprising:
   (a) a rigid support structure;
   (b) at least one lengthy light conducting elastic member having a first and a second end, said elastic member being cantilevered from a fixed mounting point on said support structure to said second end, said elastic member flexing only in response to an applied external linear acceleration and causing a linear displacement of said second end, said elastic member being at rest if said external acceleration is absent;
   (c) a light source optically coupled with said first end of said elastic member to supply light thereto;
   (d) electro-optical processing means for detecting said linear displacement in two mutually perpendicular directions, which receives the light from said second end of said elastic member; and generates signals substantially proportional to said linear acceleration and its frequency spectrum, said electro-optical processing means being fixedly mounted on said support structure and spaced apart from said second end of said elastic member.
   (e) at least one optical lens, provided to focus the light from said second end of said elastic member onto said electro-optical processing means, and to magnify said linear displacement, said optical lens being fixedly mounted on said support structure intermediate said second end of said elastic member and said electro-optical processing means.

2. The two-dimensional optical acceleration and vibration sensor of claim 1, wherein said elastic member comprises at least one optical fiber.

3. The two-dimensional optical acceleration and vibration sensor of claim 1, wherein said elastic member has at least one jacket of elastic material.

4. The two-dimensional optical acceleration and vibration sensor of claim 1, wherein the distance between said second end of said elastic member and said optical lens is substantially the same as the focal length of said optical lens.

5. The two-dimensional optical acceleration and vibration sensor of claim 1, further including a transparent viscous fluid encasing said elastic member and said optical lens for damping vibration thereof.

6. An optical acceleration and vibration sensor comprising:
   (a) a rigid support structure;
   (b) a light source providing a light beam, said light source fixedly mounted on said support structure;
   (c) at least one optical lens, optically coupled with said light source, said optical lens arranged to move only in a plane perpendicular to said light beam, said optical lens moving only in response to an applied external linear acceleration such that said acceleration causes a linear displacement of said light beam relative to said support structure, said optical lens being at rest if said external acceleration is absent;
   (d) electro-optical processing means for detecting said linear displacement in two mutually perpendicular directions, which receives the light from said light source and generates signals substantially proportional to said linear acceleration and its frequency spectrum, said electro-optical processing means being fixedly mounted on said support structure and optically coupled with said optical lens.

7. The optical acceleration and vibration sensor of claim 6, wherein the distance between said light source and said optical lens is substantially the same as the focal length of said optical lens.

8. The optical acceleration and vibration sensor of claim 6, further including a transparent viscous fluid encasing said optical lens for damping vibration thereof.

* * * * *